United States Patent
Alvarez et al.

(10) Patent No.: US 11,312,119 B2
(45) Date of Patent: Apr. 26, 2022

(54) RESINS, MULTILAYER FILMS AND PACKAGES COMPRISING THE SAME

(71) Applicant: Dow Global Technologies LLC, Midland, MI (US)

(72) Inventors: Eduardo Alvarez, Tarragona (ES); Yushan Hu, Pearland, TX (US); David Lopez, Tarragona (ES); Marcello Tognola, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 11 days.

(21) Appl. No.: 16/612,188

(22) PCT Filed: Jul. 2, 2018

(86) PCT No.: PCT/US2018/040615
§ 371 (c)(1),
(2) Date: Nov. 8, 2019

(87) PCT Pub. No.: WO2019/018127
PCT Pub. Date: Jan. 24, 2019

(65) Prior Publication Data
US 2021/0078314 A1    Mar. 18, 2021

(30) Foreign Application Priority Data

Jul. 18, 2017 (EP) ..................... 17382469
Jul. 31, 2017 (EP) ..................... 17382525

(51) Int. Cl.
| | |
|---|---|
| *B32B 27/32* | (2006.01) |
| *B32B 1/02* | (2006.01) |
| *B32B 27/08* | (2006.01) |
| *B65D 65/40* | (2006.01) |
| *C08L 23/14* | (2006.01) |

(52) U.S. Cl.
CPC ............ *B32B 27/32* (2013.01); *B32B 1/02* (2013.01); *B32B 27/08* (2013.01); *B65D 65/40* (2013.01); *C08L 23/14* (2013.01); *B32B 2250/03* (2013.01); *B32B 2250/242* (2013.01); *B32B 2270/00* (2013.01); *B32B 2307/704* (2013.01); *B32B 2307/72* (2013.01); *B32B 2439/46* (2013.01); *B32B 2439/70* (2013.01); *C08L 2205/03* (2013.01)

(58) Field of Classification Search
CPC .......... C08L 23/14; C08L 53/00; C08L 23/06
See application file for complete search history.

(56) References Cited

U.S. PATENT DOCUMENTS

| | | |
|---|---|---|
| 6,849,313 B2 | 2/2005 | Mechelaere et al. |
| 7,863,383 B2 | 1/2011 | Gibbons et al. |
| 8,691,916 B2 | 4/2014 | Wu et al. |
| 8,822,598 B2 | 9/2014 | Li Pi Shan et al. |
| 8,916,249 B2 | 12/2014 | Liang et al. |
| 9,132,615 B2 | 9/2015 | Karsten et al. |
| 2011/0313108 A1 | 12/2011 | Shan et al. |
| 2014/0174509 A1* | 6/2014 | Bonekamp .............. B32B 27/08 136/251 |
| 2014/0377548 A1 | 12/2014 | Billouard et al. |
| 2016/0325534 A1 | 11/2016 | Hu et al. |
| 2017/0008263 A1 | 1/2017 | Hu et al. |
| 2021/0276305 A1* | 9/2021 | Hu .......................... B32B 27/08 |

FOREIGN PATENT DOCUMENTS

| | | |
|---|---|---|
| KR | 1290901 B1 | 7/2013 |
| WO | 2013/101931 A1 | 7/2013 |
| WO | 2015/127026 A1 | 8/2015 |
| WO | 2017/053221 A1 | 3/2017 |

OTHER PUBLICATIONS

PCT/US2018/040615, International Search Report and Written Opinion dated Sep. 6, 2018.
PCT/US2018/040615, International Preliminary Report on Patentability dated Jan. 3, 2020.
EP17382469, European Search Report and Written Opinion dated Nov. 15, 2017.

* cited by examiner

Primary Examiner — Jeffrey C Mullis

(57) ABSTRACT

The present invention provides resins for use as a sealant layer in a multilayer film, multilayer films, and packages formed from such films. In one aspect, a resin for use as a sealant layer in a multilayer film comprises (a) 10 to 30 weight percent low density polyethylene based on the total weight of the resin; (b) 60 weight percent or more of a random copolymer polypropylene based on the total weight of the resin; and (c) 5 to 25 weight percent of a crystalline block copolymer composite (CBC) comprising: i) a crystalline ethylene based polymer (CEP) comprising at least 90 mol % polymerized ethylene; ii) an alpha-olefin-based crystalline polymer (CAOP); and iii) a block copolymer comprising (1) a crystalline ethylene block (CEB) comprising at least 90 mol % polymerized ethylene and (2) a crystalline alpha-olefin block (CAOB).

16 Claims, 3 Drawing Sheets

RESINS, MULTILAYER FILMS AND PACKAGES COMPRISING THE SAME

FIELD

The present invention relates to resins, to multilayer films comprising at least one layer formed from such resins, and to packages comprising such films.

INTRODUCTION

Heat sealable and easy-opening films are employed on a large scale for temporarily closing containers that include, for example, food products. For example, a peelable film can be sealed to a rigid container such as a tray. During use, a consumer tears away the peelable film.

Heat sealable films must be capable of being sealed upon the application of heat. During typical sealing processes, the backing or web layer of the film comes into direct contact with a heated surface such as a sealing jaw. Heat is thus transferred through the backing layer of the film to melt and fuse the inner sealant layer to form a seal.

Moreover, if the package to be sealed is designed to contain food, particularly unrefrigerated food, then in order for the product to have an acceptable shelf life (for example at least six months) the seal should be capable of surviving a retort operation. A typical retort process subjects the sealed package to a temperature of 100° C. to 135° C. for 10 to 60 minutes or even up to 100 minutes, depending on the size of the container. During the retort process, gases are generated within the package and pressure increases greatly. Although the retort system may include an over pressure to help balance the package internal pressures, the net result will still be a pressurized package during retorting. Thus, the films used to seal the container must be sufficiently strong to withstand the increased internal pressure and the elevated temperatures. Because of the need to withstand such pressures, seals used in retort applications are typically difficult to open at room temperature using average manual force. It would be desirable to have a heat sealable film which could withstand the conditions of retort applications yet still be easily opened manually by a consumer.

The force required to pull a seal apart is called "seal strength" or "heat seal strength" which can be measured in accordance with ASTM F2029-00(B). The desired seal strength varies according to specific end user applications. For flexible packaging applications, such as cereal liners, snack food packages, cracker tubes and cake mix liners, the seal strength desired is generally in the range of about 2-10 N/15 mm. For example, for easy-open cereal box liners, a seal strength in the range of about 3-6 N/15 mm is commonly specified, although specific targets vary according to individual manufactures requirements. In addition to flexible packaging application, a sealable and peelable film can also be used in rigid package applications, such as lids for convenience items (e.g., snack food such as puddings) and medical devices. Typical rigid packages also have a seal strength of about 3-6 N/15 mm.

Multilayer films or structures to be sealed normally include a sealant layer that when heated seals the film or structure to another film surface (of the same film or a different film), to a rigid package, or to another surface. There a number of peel systems by which a package can be opened.

There remains a need for new approaches to multilayer films and/or structures that provide consistent and more easily tailorable opening forces when incorporated into a package.

SUMMARY

The present invention provides resins that can be used as a sealant layer in multilayer films and to multilayer films that can provide retortable and easy open seals when incorporated into a package. For example, in some embodiments, multilayer films, when incorporated into a package, can maintain post-retort seal strength. In some embodiments, multilayer films, when incorporated into a package, provide an "easy open" seal (e.g., the film can have a maximum seal strength of 2.5 to 6.5 N/15 mm at temperatures between 100° C. and 140° C. when measured according to ASTM F2029-00(B)).

In one aspect, the present invention provides a resin for use as a sealant layer in a multilayer film that comprises: (a) 10 to 30 weight percent low density polyethylene based on the total weight of the resin; (b) 60 weight percent or more of a random copolymer polypropylene based on the total weight of the resin; and (c) 5 to 25 weight percent of a crystalline block copolymer composite (CBC) comprising: i) a crystalline ethylene based polymer (CEP) comprising at least 90 mol % polymerized ethylene; ii) an alpha-olefin-based crystalline polymer (CAOP); and iii) a block copolymer comprising (1) a crystalline ethylene block (CEB) comprising at least 90 mol % polymerized ethylene and (2) a crystalline alpha-olefin block (CAOB). In some embodiments, the resin comprises 10 to 20 weight percent of the low density polyethylene, 60 to 85 weight percent of the random copolymer polypropylene, and 5 to 20 weight percent of the CBC.

In another aspect, the present invention provides a sealant layer comprising a resin according to any of the embodiments of resins disclosed herein.

In another aspect, the present invention relates to a multilayer film comprising a sealant layer comprising any of the embodiments of resins disclosed herein.

In another aspect, the present invention relates to a package, such as a pouch, comprising any of the multilayer films disclosed herein.

In another aspect, the present invention relates to a package comprising any of the multilayer films disclosed herein and a tray, wherein the sealant layer is sealed to at least a portion of the tray.

In various embodiments, packages of the present invention may have been retorted, sterilized, or pasteurized.

These and other embodiments are described in more detail in the Detailed Description.

DETAILED DESCRIPTION

Figure 1:
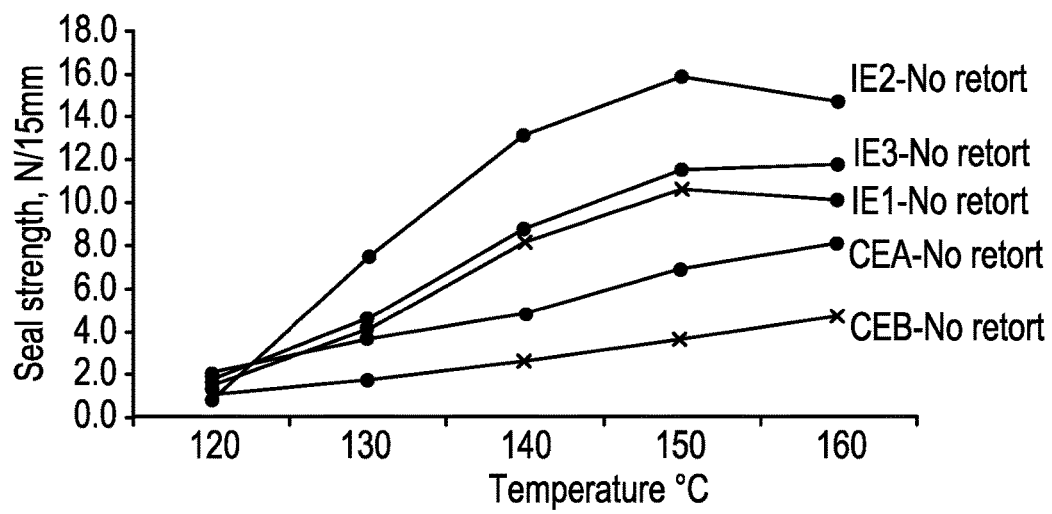
FIG. 1 is a chart illustrating the heat seal strengths of multilayer films according to some embodiments of the present invention and comparative films at various temperatures as discussed in Example 1.

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

"Polypropylene" means a polymer having greater than 50 wt % units derived from propylene monomer. The term "polypropylene" includes homopolymers of propylene such as isotactic polypropylene, random copolymers of propylene and one or more $C_{2, 4-8}$ α-olefins in which propylene comprises at least 50 mole percent, and impact copolymers of polypropylene.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

The term "in adhering contact" and like terms mean that one facial surface of one layer and one facial surface of another layer are in touching and binding contact to one another.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and include the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

In one aspect, the present invention provides a resin for use as a sealant layer in a multilayer film that comprises: (a) 10 to 30 weight percent low density polyethylene based on the total weight of the resin; (b) 60 weight percent or more of a random copolymer polypropylene based on the total weight of the resin; and (c) 5 to 25 weight percent of a crystalline block copolymer composite (CBC) comprising: i) a crystalline ethylene based polymer (CEP) comprising at least 90 mol % polymerized ethylene; ii) an alpha-olefin-based crystalline polymer (CAOP); and iii) a block copolymer comprising (1) a crystalline ethylene block (CEB) comprising at least 90 mol % polymerized ethylene and (2) a crystalline alpha-olefin block (CAOB). In some embodiments, the resin comprises 10 to 20 weight percent of the low density polyethylene, 60 to 85 weight percent of the random copolymer polypropylene, and 5 to 20 weight percent of the CBC. The resin, in some embodiments, comprises 10 to 20 weight percent of the low density polyethylene, 60 to 70 weight percent of the random copolymer polypropylene, and 15 to 20 weight percent of the CBC. In some embodiments, the low density polyethylene has a melt index ($I_2$) of 3 g/10 minutes or less.

A resin of the present invention for use as a sealant layer can comprise a combination of two or more embodiments as described herein.

In another aspect, the present invention provides a sealant layer comprising a resin according to any of the embodiments of resins disclosed herein.

In another aspect, the present invention relates to a multilayer film comprising a sealant layer comprising any of the embodiments of resins disclosed herein. In some embodiments, the multilayer film further comprises a layer in adhering contact with the sealant layer, wherein the layer comprises at least 80 percent by weight polypropylene. A multilayer film of the present invention can comprise a combination of two or more embodiments as described herein.

In another aspect, the present invention relates to a package comprising any of the multilayer films disclosed herein. In some embodiments, the package is a pouch.

In another aspect, the present invention relates to a package comprising any of the multilayer films disclosed herein and a tray, wherein the sealant layer of the multilayer film is sealed to at least a portion of the tray.

In various embodiments, packages of the present invention may have been retorted, sterilized, or pasteurized. In some embodiments, a package of the present invention has been retorted by heating to a temperature of at least 100° C. for 10-60 minutes. A package of the present invention, in some embodiments, has been sterilized by heating to a temperature of at least 132° C. for at least 20 minutes. In some embodiments, a package of the present invention has been pasteurized by heating to a temperature of at least 121° C. for at least 40 minutes.

A package of the present invention can comprise a combination of two or more embodiments as described herein.

Resin for Use as a Sealant Layer

Embodiments of the present invention are directed resins suitable for use as a sealant layer in a multilayer film. The resins when used as a sealant layer, in some embodiments, can advantageously provide phase stabilization during a retort process, maintain the post-retort seal strength and/or control the easy-peel failure mechanism (e.g., no delamination). Such properties can lead to an enhanced consumer experience when using a lid on a tray or package (e.g., pouch) formed from a multilayer film incorporating such resins in the sealant layer.

Resins of the present invention, according to some embodiments, comprise 10 to 30 weight percent low density polyethylene, 60 weight percent or more of a random copolymer polypropylene, and 5 to 25 weight percent of a crystalline block copolymer composite (CBC) (discussed further below), each based on the total weight of the resin.

Resins according to embodiments of the present invention comprise 10 to 30 weight percent of low density polyethylene (LDPE) based on the weight of the resin. All individual values and subranges from 10 to 30 weight percent are included herein and disclosed herein. For example, the resin can comprise from a lower limit of 10, 12, 13, 15, or 17 weight percent LDPE to an upper limit of 20, 22, 23, 25, 26, 29, or 30 weight percent LDPE. In some embodiments, the resin comprises 10 to 20 weight percent LDPE, based on the weight of the resin. It should be understood that blends of different LDPEs could also be included in the resin, and all references to LDPE generally should be understood as referring to one or more LDPEs.

In some embodiments, the LDPE has a density of 0.916 to 0.935 g/cm$^3$. All individual values and subranges from 0.916 to 0.935 g/cm$^3$ are included and disclosed herein; for example the density of the LDPE can be from 0.918 to 0.930 g/cm$^3$, or in the alternative, from 0.920 to 0.932 g/cm$^3$, or in the alternative, from 0.920 to 0.930 g/cm$^3$.

In some embodiments, the LDPE has a melt index ($I_2$) of 3 g/10 minutes or less. All individual values and subranges up to 3 g/10 minutes are included herein and disclosed herein. For example, the LDPE can have a melt index from a lower limit of 0.1, 0.2, 0.25, 0.5, 0.75, 1, or 2 g/10 minutes to an upper limit of 1, 1.5, 2, 2.5, or 3 g/10 minutes. The LDPE has a melt index ($I_2$) of up to 10 g/10 minutes in some embodiments. The LDPE has a melt index ($I_2$) of up to 2.5 g/10 minutes in some embodiments. In some embodiments, the LDPE has a melt index ($I_2$) of 0.1 to 2 g/10 minutes.

Examples of commercially available LDPE that can be used in embodiments of the present invention include DOW™ LDPE 410E, AGILITY™ EC 7000 Performance LDPE, DOW™ LDPE 150E, DOW™ LDPE 310E, DOW™ LDPE 320E, DOW™ LDPE 450E, DOW™ LDPE 770G, and AGILITY™ EC 7220 Performance LDPE, as well as other low density polyethylenes, which are commercially available from The Dow Chemical Company, as well as other low density polyethylenes commercially available from others in the industry.

Resins according to embodiments of the present invention comprise 60 weight percent or more of random copolymer polypropylene (rcPP) based on the weight of the resin. In some embodiments, resins comprise from 60 to 85 weight percent rcPP. All individual values and subranges from 60 to 85 weight percent are included herein and disclosed herein. For example, the resin can comprise from a lower limit of 60, 65, 67, 70, 71, 74, 75, 77, or 80 weight percent rcPP to an upper limit of 70, 72, 75, 76, 80, 83, or 85 weight percent rcPP. In some embodiments, the resin comprises 60 to 70 weight percent rcPP, based on the weight of the resin. It should be understood that blends of different rcPPs could also be included in the resin, and all references to rcPP generally should be understood as referring to one or more rcPPs.

A variety of random copolymer polypropylenes can be used in the resin in various embodiments. With random copolymer polypropylene, ethylene is typically the other monomer included. Typically suitable random copolymer polypropylenes have a melt flow rate of 0.5 to 10 g/10 minutes. Examples of commercially available random copolymer polypropylene that can be used in embodiments of the present invention include 6D83K and DR155.01, as well as other random copolymer polypropylenes, which are commercially available from Braskem Europe GmbH.

Resins according to embodiments of the present invention further comprise 5 to 25 weight percent of a crystalline block copolymer composite (CBC) as described further below, based on the weight of the resin. All individual values and subranges from 5 to 25 weight percent are included herein and disclosed herein. For example, the resin can comprise from a lower limit of 5, 7, 8, 10, 12, 13, or 15 weight percent CBC to an upper limit of 20, 21, 22, 23, 24, or 25 weight percent CBC. In some embodiments, the resin comprises 5 to 20 weight percent CBC, based on the weight of the resin. In some embodiments, the resin comprises 15 to 20 weight percent CBC, based on the weight of the resin.

The crystalline block copolymer composite (CBC) used in resins of the present invention comprises i) a crystalline ethylene based polymer (CEP) comprising at least 90 mol % polymerized ethylene, ii) an alpha-olefin-based crystalline polymer (CAOP), and iii) a block copolymer comprising (a) a crystalline ethylene block (CEB) comprising at least 90 mol % polymerized ethylene and (b) a crystalline alpha-olefin block (CAOB).

The term "crystalline block composite" (CBC) refers to polymers having three components: a crystalline ethylene based polymer (CEP) (also referred to herein as a soft polymer), a crystalline alpha-olefin based polymer (CAOP) (also referred to herein as a hard polymer), and a block copolymer comprising a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. Additionally, the compositional split between the amount of CEP and CAOP will be essentially the same as that between the corresponding blocks in the block copolymer. When produced in a continuous process, the crystalline block composites desirably have a polydispersity index (PDI) from 1.7 to 15, specifically 1.8 to 10, specifically from 1.8 to 5, more specifically from 1.8 to 3.5. Such crystalline block composites are described in, for example, US Patent Application Publication Nos. 2011/0313106, 2011/0313107 and 2011/0313108, all published on Dec. 22, 2011, and in PCT Publication No. WO2014/043522A1, published Mar. 20, 2014, each of which are incorporated herein by reference with respect to descriptions of the crystalline block composites, processes to make them and methods of analyzing them.

The crystalline ethylene based polymer (CEP) comprises blocks of polymerized ethylene units in which any comonomer content is 10 mol % or less, specifically between 0 mol % and 10 mol %, more specifically between 0 mol % and 7 mol % and most specifically between 0 mol % and 5 mol %. The crystalline ethylene based polymer has corresponding melting points that are specifically 75° C. and above, specifically 90° C. and above, and more specifically 100° C. and above.

The crystalline alpha-olefin based polymer (CAOP) comprises highly crystalline blocks of polymerized alpha olefin units in which the monomer is present in an amount greater than 90 mol percent, specifically greater than 93 mol percent, more specifically greater than 95 mol percent, and specifically greater than 98 mol percent, based on the total weight of the crystalline alpha-olefin based polymer. In an exemplary embodiment, the polymerized alpha olefin unit is polypropylene. The comonomer content in the CAOPs is less than 10 mol percent, and specifically less than 7 mol percent, and more specifically less than 5 mol percent, and most specifically less than 2 mol %. CAOPs with propylene crystallinity have corresponding melting points that are 80° C. and above, specifically 100° C. and above, more specifically 115° C. and above, and most specifically 120° C. and above. In some embodiments, the CAOP comprise all or substantially all propylene units.

Examples of other alpha-olefin units (in addition to the propylene) that may be used in the CAOP contain 4 to 10 carbon atoms. Examples of these are 1-butene, 1-hexene, 4-methyl-1-pentene and 1-octene are the most preferred. Preferred diolefins are isoprene, butadiene, 1,4-pentadiene, 1,4-hexadiene, 1,5-hexadiene, 1,7-octadiene, 1, 9-decadiene, dicyclopentadiene, methylene-norbornene, 5-ethylidene-2-norbornene, or the like, or a combination comprising at least one of the foregoing alpha-olefin units.

The block copolymer of the crystalline block composite comprises an ethylene block (e.g., a crystalline ethylene block (CEB)) and a crystalline alpha olefin block (CAOB). In the crystalline ethylene block (CEB), ethylene monomer is present in an amount greater than 90 mol %, specifically greater than 93 mol percent, more specifically greater than 95 mol percent, and specifically greater than 90 mol percent, based on the total weight of the CEB. In an exemplary embodiment, the crystalline ethylene block (CEB) polymer is polyethylene. The polyethylene is present in an amount greater than 90 mol %, specifically greater than 93 mol percent, and more specifically greater than 95 mol percent, based on the total weight of the CEB. If any comonomer is present in in the CEB it is present in an amount of less than 10 mole %, specifically less than 5 mole %, based on the total number of moles of the CEB.

The CAOB comprises a polypropylene block that is copolymerized with other alpha-olefin units that contain 4 to 10 carbon atoms. Examples of the other alpha-olefin units are provided above. The polypropylene is present in the CAOB in an amount of greater than or equal to 90 mole %, specifically greater than 93 mole %, and more specifically greater than 95 mole %, based on the total number of moles of the CAOB. The comonomer content in the CAOBs is less than 10 mol percent, and specifically less than 7 mol percent, and more specifically less than 5 mol percent, based on the total number of moles in the CAOB. CAOBs with propylene crystallinity have corresponding melting points that are 80° C. and above, specifically 100° C. and above, more specifically 115° C. and above, and most specifically 120° C. and above. In some embodiments, the CAOB comprise all or substantially all propylene units.

In one embodiment, the crystalline block composite polymers comprise propylene, 1-butene or 4-methyl-1-pentene and one or more comonomers. Specifically, the block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds. Preferably, the monomer is propylene and the comonomer is ethylene.

Comonomer content in the crystalline block composite polymers may be measured using any suitable technique, with techniques based on nuclear magnetic resonance (NMR) spectroscopy preferred.

The crystalline block composites have a melting point Tm greater than 100° C. specifically greater than 120° C., and more specifically greater than 125° C. In an embodiment, the Tm is in the range of from 100° C. to 250° C., more specifically from 120° C. to 220° C. and also specifically in the range of from 125° C. to 220° C. Specifically the melt flow ratio (MFR) of the block composites and crystalline block composites is from 0.1 to 1000 dg/min, more specifically from 0.1 to 50 dg/min and more specifically from 0.1 to 30 dg/min.

In an embodiment, the crystalline block composites have a weight average molecular weight (Mw) from 10,000 to about 2,500,000 grams per mole (g/mole), specifically from 35000 to about 1,000,000 and more specifically from 50,000 to about 300,000, specifically from 50,000 to about 200,000 g/mole. The sum of the weight percents of soft copolymer, hard polymer and block copolymer equals 100%.

In an embodiment, the crystalline block composite polymers of the invention comprise from 0.5 to 95 wt % CEP, from 0.5 to 95 wt % CAOP and from 5 to 99 wt % block copolymer. More preferably, the crystalline block composite polymers comprise from 0.5 to 79 wt % CEP, from 0.5 to 79 wt % CAOP and from 20 to 99 wt % block copolymer and more preferably from 0.5 to 49 wt % CEP, from 0.5 to 49 wt % CAOP and from 50 to 99 wt % block copolymer. Weight percents are based on total weight of crystalline block composite. The sum of the weight percents of CEP, CAOP and block copolymer equals 100%.

Preferably, the block copolymers comprise from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. More preferably, the block copolymers comprise 25 to 75 wt % CEB and 75 to 25 wt % CAOB, and even more preferably they comprise 30 to 70 wt % CEB and 70 to 30 wt % CAOB.

In some embodiments, the crystalline block composites have a Crystalline Block Composite Index (CBCI) that is greater than zero but less than about 0.4 or from 0.1 to 0.3. In other embodiments, CBCI is greater than 0.4 and up to 1.0. In some embodiments, the CBCI is 0.1 to 0.9, from about 0.1 to about 0.8, from about 0.1 to about 0.7 or from about 0.1 to about 0.6. Additionally, the CBCI can be in the range of from about 0.4 to about 0.7, from about 0.5 to about 0.7, or from about 0.6 to about 0.9. In some embodiments, CBCI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, CBCI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Information regarding the method of making crystalline block composites for use in some embodiments of the present invention is provided in Example 2 below.

In some embodiments, the resin can comprise other polymers in addition to the low density polyethylene, the random copolymer polypropylene and the CBC. Such components could be added in relatively small amounts, such as up to 10 weight percent in some embodiments, and up to 5 weight percent in other embodiments.

It should be understood that the resin or a sealant layer incorporating the resin can further comprise one or more additives as known to those of skill in the art such as, for example, antioxidants, ultraviolet light stabilizers, thermal stabilizers, slip agents, antiblock, pigments or colorants, processing aids, crosslinking catalysts, fillers and foaming agents.

In some embodiments, the resin consists of (a) 10 to 30 weight percent low density polyethylene based on the total weight of the resin; (b) 60 weight percent or more of a random copolymer polypropylene based on the total weight of the resin; (c) 5 to 25 weight percent of a crystalline block copolymer composite (CBC) comprising: i) a crystalline ethylene based polymer (CEP) comprising at least 90 mol % polymerized ethylene; ii) an alpha-olefin-based crystalline polymer (CAOP); iii) a block copolymer comprising (1) a crystalline ethylene block (CEB) comprising at least 90 mol % polymerized ethylene and (2) a crystalline alpha-olefin block (CAOB); and (d) optionally, up to 5 weight percent of one or more additives.

In some embodiments, the resin consists essentially of (a) 10 to 30 weight percent low density polyethylene based on the total weight of the resin; (b) 60 weight percent or more of a random copolymer polypropylene based on the total weight of the resin; (c) 5 to 25 weight percent of a crystalline block copolymer composite (CBC) comprising: i) a crystalline ethylene based polymer (CEP) comprising at least 90 mol % polymerized ethylene; ii) an alpha-olefin-based crystalline polymer (CAOP); and iii) a block copolymer comprising (1) a crystalline ethylene block (CEB) comprising at least 90 mol % polymerized ethylene and (2) a crystalline alpha-olefin block (CAOB); and (d) optionally, up to 5 weight percent of one or more additives.

Sealant Layer (Layer A)

Resins of the present invention can be incorporated into a sealant layer (or Layer A) in a multilayer film using techniques known to those of skill in the art. In some embodiments, the sealant layer can be corona treated using techniques known to those of skill in the art prior to sealing.

Second Layer (Layer B)

Multilayer films of the present invention include a second layer (Layer B) having a top facial surface and a bottom facial surface, wherein the top facial surface of Layer B is in adhering contact with a bottom facial surface of the sealant layer (Layer A).

In general, Layer B can be formed from any polymer or polymer blend known to those of skill in the art. In some embodiments, Layer B comprises a polyolefin.

Layer B, in some embodiments, comprises polypropylene. Polypropylene can be particularly desirable in some embodiments as it can facilitate the retort process for a film or package. The polypropylene can comprise propylene/α-olefin copolymer, propylene homopolymer, or blends thereof. The propylene/α-olefin copolymer, in various embodiments, can be random copolymer polypropylene (rcPP), impact copolymer polypropylene (hPP+at least one elastomeric impact modifier) (ICPP), high impact polypropylene (HIPP), high melt strength polypropylene (HMS- PP), isotactic polypropylene (iPP), syndiotactic polypropylene (sPP), propylene based copolymers with ethylene, and combinations thereof.

Layer B, in some embodiments, comprises polyethylene. Polyethylene can be particularly desirable in some embodiments as it can permit the coextrusion of Layer B with the sealant layer. In such embodiments, Layer B can comprise any polyethylene known to those of skill in the art to be suitable for use as a layer in a multilayer film based on the teachings herein. For example, the polyethylene that can be used in Layer B, in some embodiments, can be ultralow density polyethylene (ULDPE), low density polyethylene (LDPE), linear low density polyethylene (LLDPE), medium density polyethylene (MDPE), high density polyethylene (HDPE), high melt strength high density polyethylene (HMS-HDPE), ultrahigh density polyethylene (UHDPE), enhanced polyethylenes, and others.

Other Layers

Some embodiments of multilayer films of the present invention can include layers beyond those described above. In such embodiments comprising three or more layers, the top facial surface of the sealant layer (Layer A) would still be the top facial surface of the film. In other words, any additional layers would be in adhering contact with a bottom facial surface of Layer B, or another intermediate layer.

For example, a multilayer film can further comprise other layers typically included in multilayer films depending on the application including, for example, barrier layers, tie layers, polyethylene layers, other polypropylene layers, etc.

In other embodiments, one or more additional layers can comprise polypropylene, polyethylene, polyamide, ethylene vinyl alcohol, polycarbonate, polystyrene, poly(methyl methacrylate), or combinations thereof.

Additives

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, fillers and foaming agents.

Multilayer films comprising the combinations of layers disclosed herein can have a variety of thicknesses depending, for example, on the number of layers, the intended use of the film, and other factors. Multilayer films of the present invention, in some embodiments, have a thickness of 25 to 200 microns (typically, 35-150 microns).

Multilayer films of the present invention, in some embodiments, can advantageously provide desirable seal properties such as a heat seal strength of 2.5 to 6.5 N/15 mm at temperatures between 100° C. and 140° C. when measured according to ASTM F2029-00(B)).

Methods of Preparing Multilayer Films

Multilayer films can be formed using techniques known to those of skill in the art based on the teachings herein. For example, for those layers that can be coextruded, such layers can be coextruded as blown films or cast films using techniques known to those of skill in the art based on the teachings herein. In particular, based on the compositions of the different film layers disclosed herein, blown film manufacturing lines and cast film manufacturing lines can be configured to coextrude multilayer films of the present invention in a single extrusion step using techniques known to those of skill in the art based on the teachings herein.

As indicated above, in some embodiments, the sealant layer (Layer A) can be corona treated using techniques known to those of skill in the art based on the teachings herein.

Packages

Multilayer films and multilayer structures of the present invention can be used to form packages. Such packages can be formed from any of the multilayer films and multilayer structures described herein.

Examples of such packages can include flexible packages, pouches, stand-up pouches, and pre-made packages or pouches. In some embodiments, multilayer films of the present invention can be used for food packages. Examples of food that can be included in such packages include meats, cheeses, cereal, nuts, juices, sauces, and others. Such packages can be formed using techniques known to those of skill in the art based on the teachings herein and based on the particular use for the package (e.g., type of food, amount of food, etc.).

Packages utilizing multilayer films of the present invention can advantageously be formed with heat seal packaging equipment utilizing continuously heated seal bars, in some embodiments. The thermal resistance properties of the outer layer of the multilayer films help protect the film structure during formation of the package with the continuously heated seal bars. Examples of such packaging equipment utilizing continuously heated seal bars include horizontal form-fill-seal machines and vertical form-fill-seal machines. Examples of packages that can be formed from such equipment include stand-up pouches, 4-corner packages (pillow pouches), fin seal packages and others.

In other embodiments, multilayer films or multilayer structures of the present invention can be sealed to a sheet or tray to form a package, such as a food package. Examples of food that can be included in such packages include meats, cheeses, and other foods.

The tray can be formed from sheets based on polyesters (such as amorphous polyethylene terephthalate, oriented polyethylene terephthalate, polybutylene terephthalate, polytrimethylene terephthalate, and polyethylene napthalate), polypropylene, polyethylene, and polystyrene. Such sheets, when not based on polyethylene, will typically include a heat seal layer (and possibly other layers) based on polyethylene which can be provided by coextrusion, lamination, or coating. Multilayer films of the present invention can be particularly well-suited for use with trays or sheets formed from polyethylene terephthalate or amorphous polyethylene terephthalate. Such trays or sheets can be formed using techniques known to those of skill in the art based on the teachings herein and based on the particular use for the package (e.g., type of food, amount of food, etc.).

A multilayer film of the present invention can be sealed to the sheet or tray via the sealant layer (Layer A) of the film using techniques known to those of skill in the art based on the teachings herein.

After sealing, packages of the present invention, in some embodiments, can be further treated to retort, sterilization, or pasteurization. In such steps, the package and its contents are heated to a particular temperature for a certain period of time as is understood to those of skill in the art. In some embodiments, packages of the present invention are retorted by heating to a temperature of at least 100° C. for 10-60 minutes. In some embodiments, packages of the present invention are sterilized by heating to a temperature of at least 132° C. for at least 20 minutes. In some embodiments, packages of the present invention are pasteurized by heating to a temperature of at least 121° C. for at least 40 minutes. In some embodiments, the multilayer films in the packages can maintain desirable seal strength following retort, sterilization, or pasteurization.

Test Methods

Unless otherwise indicated herein, the following analytical methods are used in describing aspects of the present invention:

Density

Samples for density measurement are prepared according to ASTM D 1928.

Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index

Melt indices $I_2$ (or $I_2$) and $I_{10}$ (or $I_{10}$) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

Melt Flow Rate

Melt flow rates are measured in accordance with ASTM D-1238 or ISO 1133 (230° C.; 2.16 kg).

Heat Seal Strength

Heat seal strength, or seal strength is measured using ASTM F2029-00 as follows. The film sample, which can be any thickness, is sealed to itself at different temperatures at a pressure of 5 bar and a 0.5 second dwell time (films of thicknesses greater than 100 micron are sealed with a 1 second dwell time). The samples are conditioned for 40 hours and then cut into 15 mm strips which are then pulled on an Instron tensile testing device at a rate of 100 mm/min. 5 replicate test samples are measured, and the average is recorded. The failure mechanism is also observed (cohesive failure vs. delamination).

Some embodiments of the invention will now be described in detail in the following Examples.

EXAMPLES

In these Examples, different resins are formulated, incorporated as a sealant layer in a multilayer film, and evaluated for seal strength. The raw materials used in the Examples are shown in Table 1:

TABLE 1

| Material | Description |
|---|---|
| CBC1 | olefin block copolymer available from The Dow Chemical Company (properties discussed below) |
| CBC2 | olefin block copolymer available from The Dow Chemical Company (properties discussed below) |
| RCP | random copolymer polypropylene (melt flow rate of 1.9 g/10 minutes @ 230° C. and 2.16 kg) (6D83K from Braskem) |
| LDPE1 | low density polyethylene (0.925 g/cm$^3$; $I_2$ = 2.0 g/10 minutes @190° C.) (DOW ™ LDPE 410E from The Dow Chemical Company) |
| LDPE2 | low density polyethylene (0.919 g/cm$^3$; $I_2$ = 3.9 g/10 minutes @190° C.) (AGILITY ™ EC 7000 from The Dow Chemical Company) |
| POP | polyolefin plastomer (propylene-based copolymer with ethylene) (density of 0.891 g/cm$^3$ and melt flow rate of 8.0 g/10 minutes @ 230° C. and 2.16 kg) (ENGAGE 8130 from The Dow Chemical Company) |

CBC1 is an olefin block copolymer, also referred to as a crystalline block copolymer composite, that includes 50 wt % of an ethylene-propylene copolymer (having an ethylene content of 90 wt %) and 50 wt % of isotactic polypropylene. CBC2 is an olefin block copolymer, also referred to as a crystalline block copolymer composite, that includes 30 wt % of an ethylene-propylene copolymer (having an ethylene content of 90 wt %) and 70 wt % of isotactic polypropylene.

CBC2 is synthesized as follows. Catalyst-1 ([[rel-2',2'''-[(1R,2R)-1,2-cylcohexanediylbis(methyleneoxy-κO)] bis [3-(9H-carbazol-9-yl)-5-methyl[1,1'-biphenyl]-2-olato-κO]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B(C6F5)4], substantially as disclosed in U.S. Pat. No. 5,919,983, Ex. 2, are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

CBC2 is prepared using two continuous stirred tank reactors (CSTR) connected in series. The first reactor is approximately 12 gallons in volume while the second reactor was approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 2. The first reactor contents as described in Table 2 flow to a second reactor in series. Additional monomers, solvent, hydrogen, catalyst-1, cocatalyst-1, and optionally, cocatalyst-2, are added to the second reactor.

TABLE 2

| Reactor | 1st Reactor | 2nd Reactor |
|---|---|---|
| Reactor Control Temp. (° C.) | 140 | 115 |
| Solvent Feed (lb/hr) | 144 | 360 |
| Propylene Feed (lb/hr) | 3.42 | 69.17 |
| Ethylene Feed (lb/hr) | 28.0 | 0.0 |
| Hydrogen Feed (SCCM) | 9.6 | 9.6 |
| Reactor Propylene Conc. (g/L) | 1.99 | 2.03 |
| Catalyst Efficiency (gPoly/gM) *1.0E6 | 0.581 | 0.146 |
| Catalyst Flow (lb/hr) | 0.36 | 0.93 |
| Catalyst Conc. (ppm) | 150 | 500 |
| Cocatalyst-1 Flow (lb/hr) | 0.36 | 0.58 |
| Cocatalyst-1 Conc. (ppm) | 2000 | 8000 |
| Cocat.-2 Flow (lb/hr) | 0.75 | 15.02 |
| Cocat.-2 Conc. (ppm) | 1993 | 1797 |
| DEZ Flow (lb/hr) | 1.20 | 0.00 |
| DEZ Conc. (ppm) | 29987 | 0 |
| Production Rate (lb/hr) | 31.0 | 68.1 |

CBC1, as well as other crystalline block composite polymers that can be used in embodiments of the present invention, may be prepared using similar processes that comprise contacting an addition polymerizable monomer or mixture of monomers under addition polymerization conditions with a composition comprising at least one addition polymerization catalyst, at least one cocatalyst, and a chain shuttling agent, said process being characterized by formation of at least some of the growing polymer chains under differentiated process conditions in two or more reactors operating under steady state polymerization conditions or in two or more zones of a reactor operating under plug flow polymerization conditions. The term "shuttling agent" refers to a compound or mixture of compounds that is capable of causing polymeryl exchange between at least two active catalyst sites under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In a preferred embodiment, the crystalline block composites comprise a fraction of block polymer which possesses a most probable distribution of block lengths.

Suitable processes useful in producing CBC1 and other crystalline block composites may be found, for example, in U.S. Patent Application Publication No. 2008/0269412, published on Oct. 30, 2008. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. The chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It may be more advantageous to produce CEB in the first reactor or zone with fresh chain shuttling agent added. The presence of increased levels of ethylene in the reactor or zone producing CEB may lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized. There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. An exemplary approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Exemplary catalysts and catalyst precursors for use to form the crystalline block composites include metal complexes such as disclosed in, e.g., International Publication No WO 2005/090426. Other exemplary catalysts are also disclosed in U.S. Patent Publication Nos. 2006/0199930, 2007/0167578, and 2008/0311812; U.S. Pat. No. 7,355,089; and International Publication No. WO 2009/012215.

The crystalline block composites (CBC1 and CBC2) are characterized as appropriate by Differential Scanning calorimetry (DSC), $C^{13}$ Nuclear Magnetic Resonance (NMR), Gel Permeation Chromatography (GPC), and high temperature liquid chromatography (HTLC) fractionation. These are described in more detail in US Patent Application Publication Nos. US2011/0082257, US2011/0082258 and US2011/0082249, all published on Apr. 7, 2011 and are incorporated herein by reference with respect to descriptions of the analysis methods.

The measured properties of CBC1 and CBC are provided in Table 3, below.

TABLE 3

| Material | MFR (230° C. 2.16 kg) | wt % PP from HTLC Separation | Mw, Kg/mol | Mw/Mn | Total wt % $C_2$ (NMR) | Tm (° C.) Peak 1 (Peak 2) | Tc (° C.) | Melt Enthalpy (J/g) |
|---|---|---|---|---|---|---|---|---|
| CBC1 | 9.8 | 19.9 | 104 | 2.73 | 47.6 | 108 (130) | 88 | 95 |
| CBC2 | 4.9 | 35.8 | 160 | 2.84 | 29.4 | 104 (139) | 102 | 89 |

Table 4 provides the Crystalline Block Composite Index Estimation using the Crystalline Block Composite Calculations provided below:

TABLE 4

| Material | wt % iPP | wt % EPP | wt % $C_2$ in EP | wt % $C_2$ in iPP | Crystalline Block Composite Index |
|---|---|---|---|---|---|
| CBC1 | 50 | 50 | 90 | 1 | 0.549 |
| CBC2 | 70 | 30 | 90 | 1 | 0.473 |

Crystalline Block Composite Index Calculations

CBCI provides an estimate of the quantity of block copolymer within the block composite under the assumption that the ratio of CEB to CAOB within the diblock is the same as the ratio of ethylene to alpha-olefin in the overall block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP) and polyethylene (in this example the CEP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight % propylene present in each of the fractions that are separated by HTLC. The corresponding CBCI calculations for CBC1 and CBC2 are provided in Table 5, below.

TABLE 5

| Line # | Variable | Source | CBC1 | CBC1 |
|---|---|---|---|---|
| 1 | Overall wt % C3 Total | Measured | 52.400 | 70.600 |
| 2 | wt % C3 in PP block/polymer | Measured | 99.000 | 99.000 |
| 3 | wt % C3 in PE block/polymer | Measured | 10.500 | 10.500 |
| 4 | wt fraction PP (in block or polymer) | Eq. 2 below | 0.500 | 0.679 |
| 5 | wt fraction PE (in block or polymer) | 1-Line 4 | 0.500 | 0.321 |
|  | Analysis of HTLC Separation |  |  |  |
| 6 | wt fraction isolated PP | Measured | 0.199 | 0.358 |
| 7 | wt fraction PE fraction | Measured | 0.801 | 0.642 |
| 8 | wt % C3 in PE-fraction | Eq. 4 below | 40.823 | 54.763 |
| 9 | wt fraction PP-diblock in PE fraction | Eq. 6 below | 0.343 | 0.500 |
| 10 | wt fraction PE in PE fraction | 1-Line 10 | 0.657 | 0.500 |
| 11 | wt fraction Diblock in PE fraction | 10/Line 4 | 0.685 | 0.736 |
| 12 | Crystalline Block Composite Index (CBCI) | Eq. 7 below | 0.549 | 0.473 |

Referring to Tables 4 and 5 above, the CBCI is measured by first determining a summation of the weight % propylene from each component in the polymer according to Equation 1, below, which results in the overall weight % propylene/C3 (of the whole polymer). This mass balance equation can be used to quantify the amount of the PP and PE present in the block copolymer. This mass balance equation can also be used to quantify the amount of PP and PE in a binary blend or extended to a ternary, or n-component blend. For the BCs and CBCs, the overall amount of PP or PE is contained within the blocks present in the block copolymer and the unbound PP and PE polymers.

$$\text{Wt \% C3}_{Overall} = w_{PP}(\text{wt \% C3}_{PP}) + w_{PE}(\text{wt \% C3}_{PE}) \qquad \text{Eq. 1}$$

where
$w_{pp}$=weight fraction of PP in the polymer
$w_{PE}$=weight fraction of PE in the polymer
wt % C3$_{PP}$=weight percent of propylene in PP component or block
wt % C3$_{PE}$=weight percent of propylene in PE component or block Note that the overall weight % of propylene (C3) is measured from $C^{13}$ NMR or some other composition measurement that represents the total amount of C3 present in the whole polymer. The weight % propylene in the PP block (wt % C3$_{PP}$) is set to 100 (if applicable) or if otherwise known from its DSC melting point, NMR measurement, or other composition estimate, that value can be put into its place. Similarly, the weight % propylene in the PE block (wt % C3$_{PE}$) is set to 100 (if applicable) or if otherwise known from its DSC melting point, NMR measurement, or other composition estimate, that value can be put into its place. The weight % of C3 is shown in Table 4.

Calculating the Ratio of PP to PE in the crystalline block composite and/or the specified block composite: Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the crystalline block composite and the block composite, it is assumed that the ratio of the weight fraction of PP to PE also corresponds to the average block ratio between PP and PE present in this statistical block copolymer.

$$w_{PP} = \frac{\text{wt \% C3}_{Overall} - \text{wt \% C3}_{PE}}{\text{wt \% C3}_{PP} - \text{wt \% C3}_{PE}} \qquad \text{Eq. 2}$$

where
$w_{PP}$=weight fraction of PP present in the whole polymer
wt % C3$_{PP}$=weight percent of propylene in PP component or block
wt % C3$_{PE}$=weight percent of propylene in PE component or block To estimate the amount of the block copolymer (diblock) in the Crystalline Block Composite, apply Equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP block present in the di-block copolymer. By substituting the overall weight % C3 of the whole polymer in the left hand side of Equation 3, and the weight fraction of PP (isolated from HTLC) and the weight fraction of PE (separated by HTLC) into the right hand side of Equation 3, the weight % of C3 in the PE fraction can be calculated using Equations 4 and 5. The PE fraction is described as the fraction separated from the unbound PP and contains the diblock and unbound PE. The composition of the isolated PP is assumed to be the same as the weight % propylene in the PP block as described previously.

$$\text{wt \% C3}_{Overall} = w_{PPisolated}(\text{wt \% C3}_{PP}) + w_{PE-fraction}(\text{wt \% C3}_{PE-fraction}) \qquad \text{Eq. 3}$$

$$\text{wt \% C3}_{PE-fraction} = \frac{\text{wt \% C3}_{Overall} - w_{PPisolated}(\text{wt \% C3}_{PP})}{w_{PE-fraction}} \qquad \text{Eq. 4}$$

$$w_{PE-fraction} = 1 - w_{PPisolated} \qquad \text{Eq. 5}$$

where
$w_{PPisolated}$=weight fraction of isolated PP from HTLC
$w_{PE-fraction}$=weight fraction of PE separated from HTLC, containing the diblock and unbound PE
wt % C3$_{PP}$=weight % of propylene in the PP; which is also the same amount of propylene present in the PP block and in the unbound PP
wt % C3$_{PE-fraction}$=weight % of propylene in the PE-fraction that was separated by HTLC wt % C3$_{Overall}$=overall weight % propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP-diblock} = \frac{wt\ \%\ C3_{PE-fraction} - wt\ \%\ C3_{PE}}{wt\ \%\ C3_{PP} - wt\ \%\ C3_{PE}} \qquad \text{Eq. 6}$$

Where wt % C3$_{PE-fraction}$=weight % of propylene in the PE-fraction that was separated by HTLC (Equation 4)

wt % C3$_{PP}$=weight % of propylene in the PP component or block (defined previously)

wt % C3$_{PE}$=weight % of propylene in the PE component or block (defined previously)

$w_{PP-diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the di-block ($w_{PP-diblock}$) multiplied by two. Another way to calculate this is by dividing the weight fraction of PP in the diblock ($w_{PP-diblock}$) by the weight fraction of PP in the whole polymer (Equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 7. To estimate the CBCI, the weight fraction of diblock in the PE fraction calculated using Equation 6 is divided by the overall weight fraction of PP (as calculated in Equation 2) and then multiplied by the weight fraction of the PE fraction.

$$CBCI = \frac{w_{PP-diblock}}{w_{PP}} \cdot w_{PE-fraction} \qquad \text{Eq. 7}$$

Where $w_{PP-diblock}$=weight fraction of PP in the diblock separated with the PE-fraction by HTLC (Equation 6)

$w_{PP}$=weight fraction of PP in the polymer $w_{PE-fraction}$=weight fraction of PE separated from HTLC, containing the diblock and unbound PE (Equation 5)

Example 1

A number of multilayer films are prepared as set forth in Table 6. The films are 3-layer, 60 micron films having the following structure: Layer A (15 microns)/Layer B (30 microns)/Layer C (15 microns). Multilayer films according to some embodiments of the present invention are identified as Inventive Films, whereas the other multilayer films are Comparative Films.

TABLE 6

| | Layer A | Layer B | Layer C (Sealant Layer) |
|---|---|---|---|
| Comparative Film A ("CEA") | RCP | RCP | 75% RCP 25% LDPE1 |
| Comparative Film B ("CEB") | RCP | RCP | Comparative Sealant Resin |
| Inventive Film 1 ("IE1") | RCP | RCP | 75% RCP 10% LDPE1 15% CBC1 |
| Inventive Film 2 ("IE2") | RCP | RCP | 70% RCP 10% LDPE1 20% CBC1 |
| Inventive Film 3 ("IE3") | RCP | RCP | 75% RCP 10% LDPE1 15% CBC2 |

The percentages in Table 6 are weight percentages based on the total weight of the respective layer. The Comparative Sealant Resin used in Comparative Film B is a melt blend of a propylene-based plastomer or elastomer (with ethylene copolymer) and low density polyethylene such as is described in U.S. Pat. No. 8,691,916.

The films are fabricated through a conventional polyethylene blown film line to provide multilayer films with a weight distribution of 25% Layer A/50% Layer B/25% Layer C. The melt temperatures of resin extrusion for Layers A, B, and C are approximately 233-236° C., 224-233° C., and 215-227° C., respectively. The die diameter of the blown film line is 60 mm, the blow-up ratio is 2.5, and the die gap is 1.8 mm. The output rate is 9 kg/hr.

The heat seal strengths of the films without any retort operation are measured in the cross direction, and the results are shown in FIG. 1. For each data point shown in FIG. 1 (and subsequent Figures), a bullet means that a cohesive failure mechanism is observed and a cross means that delamination occurred such that an "easy peel" failure mechanism is not controlled. Each of the Inventive Films provide higher peel force than the Comparative Films. In addition, a higher loading of CBC (Inventive Film 2, IE2) or higher isotactic polypropylene content (Inventive Film 3, IE3) also provide higher peel strengths.

Figure 2:
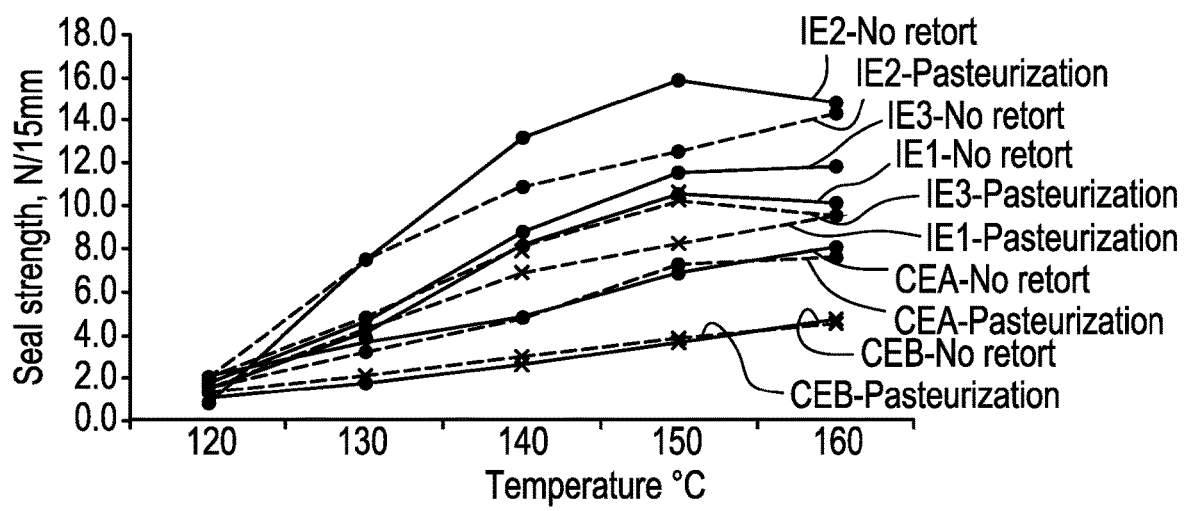
FIG. 2 is a chart illustrating the heat seal strengths of multilayer films according to some embodiments of the present invention and comparative films at various temperatures after pasteurization as discussed in Example 1.

Samples of the films are also pasteurized at 121° C. for 40 minutes in a steam sterilizer (Fedegari FB02TS steam sterilizer). Prior to pasteurization, the samples are sealed as described in the heat seal strength test except that a piece of PET film is placed between the sample films (except in the area to be sealed) prior to sealing to avoid stickiness during pasteurization. The heat seal strengths are measured in the cross direction, and the results are shown in FIG. 2. A straight line shows the non-retorted conditions, while the dotted line applies for the post pasteurization heat seal strength test. The Comparative Sealant Resin (Comparative Film B, CEB) delaminates at 130° C., whereas with the addition of CBC, delamination is not observed until 140° C. (Inventive Film 1, IE1), or until 150° C. (Inventive Film 2, IE2), or not at all (Inventive Film 3, IE3).

Figure 3:
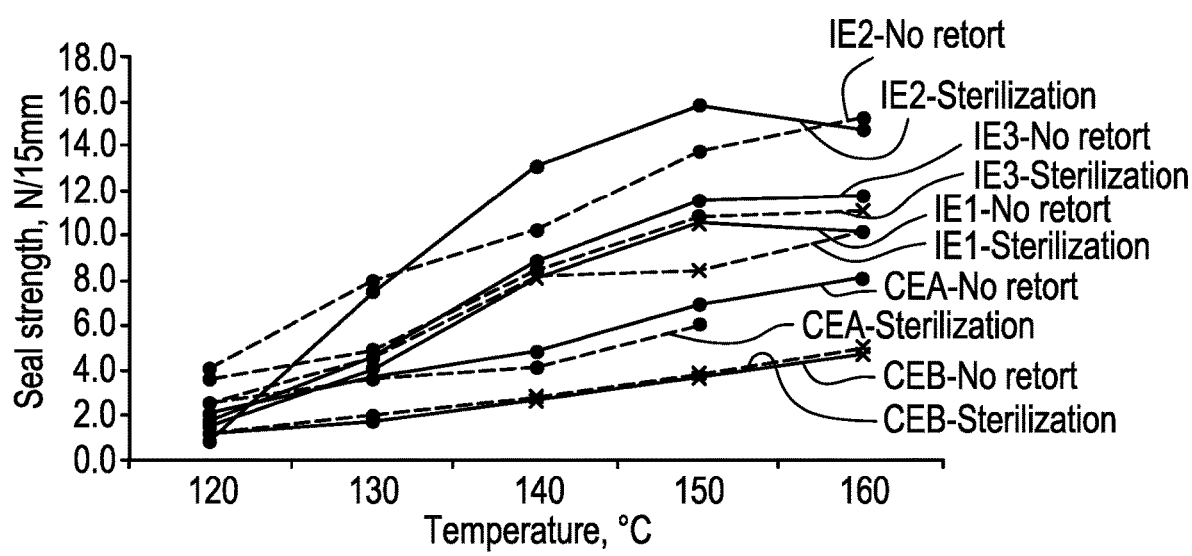
FIG. 3 is a chart illustrating the heat seal strengths of multilayer films according to some embodiments of the present invention and comparative films at various temperatures after sterilization as discussed in Example 1.

Samples of the films are also sterilized at 132° C. for 20 minutes in a steam sterilizer (Fedegari FB02TS steam sterilizer). Prior to pasteurization, the samples are sealed as described in the heat seal strength test except that a piece of PET film is placed between the sample films (except in the area to be sealed) prior to sealing to avoid stickiness during pasteurization. The heat seal strengths are measured in the cross direction, and the results are shown in FIG. 3. With the addition of CBC, delamination is not observed until 140° C. (Inventive Film 1, IE1), or until 160° C. (Inventive Film 3, IE3), or not at all (Inventive Film 2, IE2). The data also show how peel force and stabilization can be adjusted with the structure (ratio of EP and iPP) and amount of CBC in the composition.

Example 2

Additional multilayer films are prepared as set forth in Table 7. The films are 3-layer, 60 micron films having the following structure: Layer A (15 microns)/Layer B (30 microns)/Layer C (15 microns). Multilayer films according to some embodiments of the present invention are identified as Inventive Films, whereas the other multilayer films are Comparative Films.

TABLE 7

|  | Layer A | Layer B | Layer C (Sealant Layer) |
| --- | --- | --- | --- |
| Comparative Film A ("CEA") | RCP | RCP | 75% RCP 25% LDPE1 |
| Comparative Film B ("CEB") | RCP | RCP | Comparative Sealant Resin |
| Inventive Film 4 ("IE4") | RCP | RCP | 70% RCP 10% LDPE1 20% CBC1 |
| Inventive Film 5 ("IE5") | RCP | RCP | 65% RCP 15% LDPE1 20% CBC1 |
| Inventive Film 6 ("IE6") | RCP | RCP | 60% RCP 20% LDPE1 20% CBC1 |
| Inventive Film 7 ("IE7") | RCP | RCP | 70% RCP 15% LDPE2 15% CBC1 |

The percentages in Table 7 are weight percentages based on the total weight of the respective layer. Comparative Films A and B have the same compositions as those analyzed in Example 1.

The films are fabricated through a conventional polyethylene blown film line to provide multilayer films with a weight distribution of 25% Layer A/50% Layer B/25% Layer C. The melt temperatures of resin extrusion for Layers A, B, and C are approximately 233-236° C., 224-233° C., and 215-227° C., respectively. The die diameter of the blown film line is 60 mm, the blow-up ratio is 2.5, and the die gap is 1.8 mm. The output rate is 9 kg/hr. Inventive Films 4-7 are corona treated to 42 dynes/centimeter.

Figure 4:
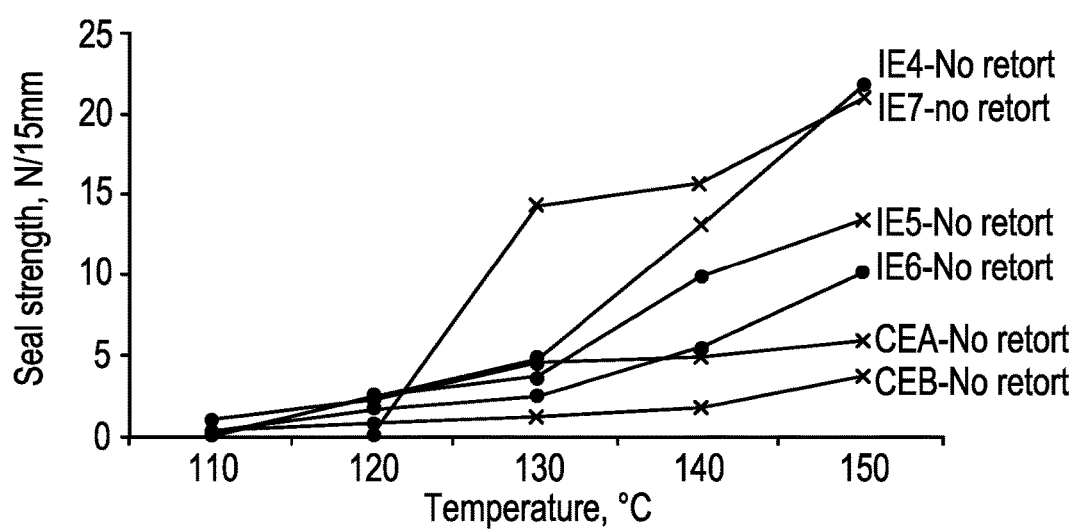
FIG. 4 is a chart illustrating the heat seal strengths of multilayer films according to some embodiments of the present invention and comparative films at various temperatures as discussed in Example 2.

The heat seal strengths of the films without any retort operation are measured in the cross direction, and the results are shown in FIG. 4. The data show that higher LDPE content in the sealant layer results in lower seal strength or peel force (see IE4, IE5, and IE6).

Figure 5:
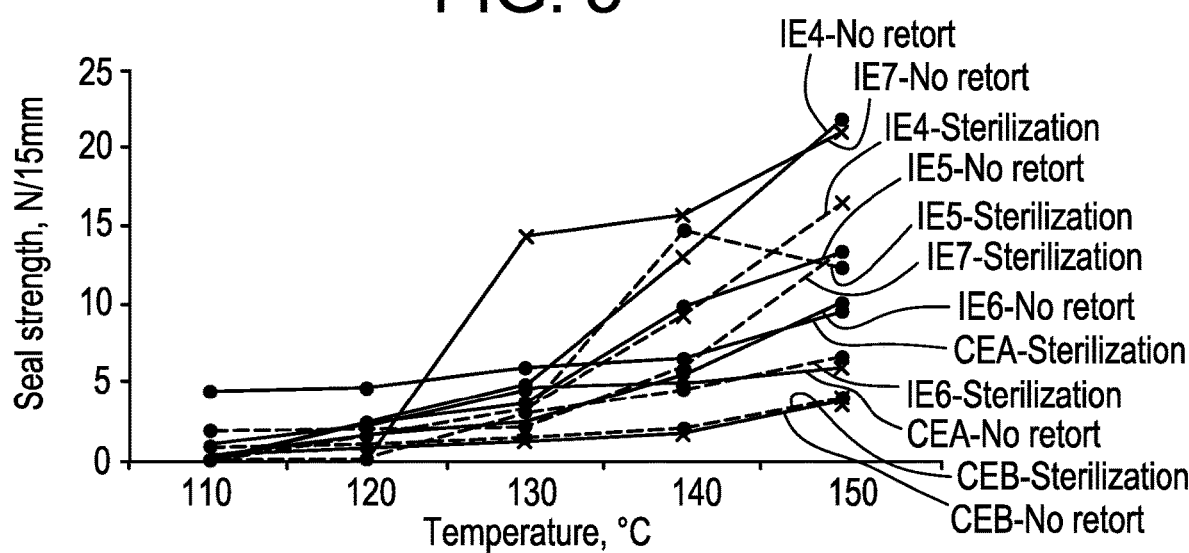
FIG. 5 is a chart illustrating the heat seal strengths of multilayer films according to some embodiments of the present invention and comparative films at various temperatures after sterilization as discussed in Example 2.

Samples of the films are also sterilized at 132° C. for 20 minutes in a steam sterilizer. The heat seal strengths are measured in the cross direction, and the results are shown in FIG. 5. As with Example 1, the seal strength decreases after sterilization. The data in FIG. 5 show that peel force before and after pasteurization can be adjusted, depending on the particular application, by varying the amount of LDPE in the sealant layer, with higher LDPE providing higher seal strength, though Inventive Film 4, IE4, delaminated at 140° C. after sterilization).

Example 3

Additional multilayer films are prepared as set forth in Table 8. The films are 3-layer, 60 micron films having the following structure: Layer A (15 microns)/Layer B (30 microns)/Layer C (15 microns). Multilayer films according to some embodiments of the present invention are identified as Inventive Films, whereas the other multilayer films are Comparative Films.

TABLE 8

|  | Layer A | Layer B | Layer C (Sealant Layer) |
| --- | --- | --- | --- |
| Comparative Film A ("CEA") | RCP | RCP | 75% RCP 25% LDPE1 |
| Comparative Film B ("CEB") | RCP | RCP | Comparative Sealant Resin |
| Comparative Film C ("CEC") | RCP | RCP | 70% RCP 15% LDPE1 15% POP |
| Inventive Film 8 ("IE8") | RCP | RCP | 70% RCP 15% LDPE1 15% CBC1 |

The percentages in Table 8 are weight percentages based on the total weight of the respective layer. Comparative Films A and B have the same compositions as those analyzed in Example 1.

The films are fabricated through a conventional polyethylene blown film line to provide multilayer films with a weight distribution of 25% Layer A/50% Layer B/25% Layer C. The melt temperatures of resin extrusion for Layers A, B, and C are approximately 233-236° C., 224-233° C., and 215-227° C., respectively. The die diameter of the blown film line is 60 mm, the blow-up ratio is 2.5, and the die gap is 1.8 mm. The output rate is 9 kg/hr. Comparative Film C and Inventive Film 8 are corona treated to 42 dynes/centimeter.

Figure 6:
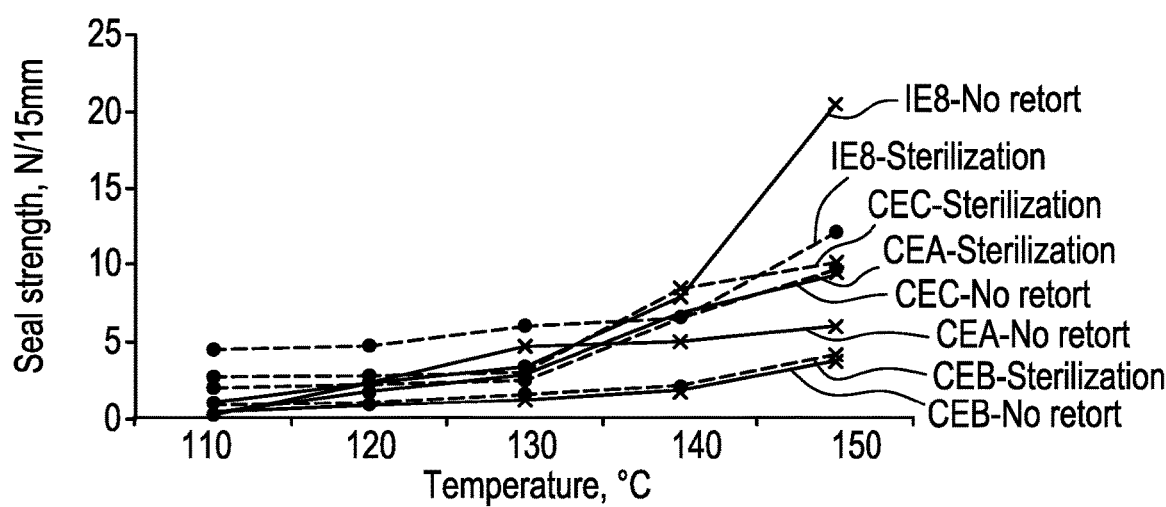
FIG. 6 is a chart illustrating the heat seal strengths of multilayer films according to some embodiments of the present invention and comparative films at various temperatures after sterilization as discussed in Example 3.

The heat seal strengths of the films without any retort operation are measured in the cross direction. Samples of the films are also sterilized at 132° C. for 20 minutes in a steam sterilizer. The heat seal strengths are measured in the cross direction. The results of the seal strength measurements are shown in FIG. 6. The data show that the results provided by including a CBC (Inventive Film 8, IE8) are not reproduced by including instead a random (non di-block) propylene-based copolymer with ethylene (Comparative Film C, CEC). Comparative Film C shows delamination after sterilization, whereas the sealant resin with CBC (Inventive Film 8) is well-stabilized at all temperatures after sterilization.

We claim:
1. A resin for use as a sealant layer in a multilayer film comprising:
(a) 10 to 30 weight percent low density polyethylene based on the total weight of the resin;
(b) 60 weight percent or more of a random copolymer polypropylene based on the total weight of the resin; and
(c) 5 to 25 weight percent of a crystalline block copolymer composite (CBC) comprising:
  i) a crystalline ethylene based polymer (CEP) comprising at least 90 mol % polymerized ethylene;
  ii) an alpha-olefin-based crystalline polymer (CAOP); and iii) a block copolymer comprising (1) a crystalline ethylene block (CEB) comprising at least 90 mol % polymerized ethylene and (2) a crystalline alpha-olefin block (CAOB);

wherein a multilayer film using the resin as a sealant layer has a heat seal strength of 2.5 to 6.5 N/15 mm at temperatures between 100° C. and 140° C. when measured according to ASTM F2029-00(B).

2. The resin of claim 1, wherein the resin comprises 10 to 20 weight percent of the low density polyethylene, 60 to 85 weight percent of the random copolymer polypropylene, and 5 to 20 weight percent of the CBC.

3. The resin of claim 1, wherein the resin comprises 10 to 20 weight percent of the low density polyethylene, 60 to 70 weight percent of the random copolymer polypropylene, and 15 to 20 weight percent of the CBC.

4. The resin of claim 1, wherein the low density polyethylene has a melt index ($I_2$) of 3 g/10 minutes or less.

5. A sealant layer comprising the resin of claim 1.

6. A multilayer film comprising the sealant layer of claim 5.

7. The multilayer film of claim 6, further comprising a layer in adhering contact with the sealant layer, wherein the layer comprises at least 80 percent by weight polypropylene.

8. A package comprising the multilayer film of claim 6.

9. The package of claim 8, wherein the package is a pouch.

10. A package comprising the multilayer film of claim 8 and a tray, wherein the sealant layer is sealed to at least a portion of the tray.

11. The package according to claim 8, wherein the package has been retorted by heating to a temperature of at least 100° C. for 10-60 minutes.

12. The package according to claim 8, wherein the package has been sterilized by heating to a temperature of at least 132° C. for at least 20 minutes.

13. The package according to claim 8, wherein the package has been pasteurized by heating to a temperature of at least 121° C. for at least 40 minutes.

14. The package according to claim 10, wherein the package has been retorted by heating to a temperature of at least 100° C. for 10-60 minutes.

15. The package according to claim 10, wherein the package has been sterilized by heating to a temperature of at least 132° C. for at least 20 minutes.

16. The package according to claim 10, wherein the package has been pasteurized by heating to a temperature of at least 121° C. for at least 40 minutes.

* * * * *